US010510475B2

(12) United States Patent
Dinulovic et al.

(10) Patent No.: US 10,510,475 B2
(45) Date of Patent: Dec. 17, 2019

(54) INDUCTION COMPONENT

(71) Applicant: Wuerth Elektronik eiSos GmbH & Co. KG, Waldenburg (DE)

(72) Inventors: Dragan Dinulovic, Schwaebisch Hall (DE); Alexander Gerfer, Odenthal (DE)

(73) Assignee: Wuerth Elektronik eiSos GmbH & Co. KG, Waldenburg (DE)

( * ) Notice: Subject to any disclaimer, the term of this patent is extended or adjusted under 35 U.S.C. 154(b) by 145 days.

(21) Appl. No.: 14/350,286

(22) PCT Filed: Oct. 4, 2012

(86) PCT No.: PCT/EP2012/069615

§ 371 (c)(1),
(2) Date: Apr. 7, 2014

(87) PCT Pub. No.: WO2013/072135

PCT Pub. Date: May 23, 2013

(65) Prior Publication Data

US 2014/0285300 A1 Sep. 25, 2014

(30) Foreign Application Priority Data

Nov. 15, 2011 (DE) ........................ 10 2011 086 403

(51) Int. Cl.
*H01F 21/02* (2006.01)
*H01F 19/00* (2006.01)
(Continued)

(52) U.S. Cl.
CPC ............. *H01F 19/00* (2013.01); *H01F 27/29* (2013.01); *H01F 27/2895* (2013.01)

(58) Field of Classification Search
CPC ........ H01F 29/025; H01F 21/12; H01F 27/40; H01F 29/02; H01F 29/06; H01F 27/29; H01F 27/2895
(Continued)

(56) References Cited

U.S. PATENT DOCUMENTS 1,567,672 A * 12/1925 Oswald .......................... 318/244
2,491,567 A * 12/1949 Kendrick ................ H01F 38/10
336/146
(Continued)

FOREIGN PATENT DOCUMENTS

DE 732281 A 2/1943
DE 942823 B 5/1956
(Continued)

OTHER PUBLICATIONS

Thin Film, BCC Research.*

*Primary Examiner* — Elvin G Enad
*Assistant Examiner* — Kazi Hossain
(74) *Attorney, Agent, or Firm* — Boyle Fredrickson, S.C.

(57) ABSTRACT

The invention proposes an induction component produced using thin film technology which can be used for a variety of functions. It contains, on a magnet core with a ring shape, two coil devices which, for their Part, are in turn constructed from at least two coils. The adjacent end windings of adjacent coils are connected to one another and to a common solder pad within each coil device. This makes it possible to connect individual coils and thus to utilize different functions of the induction component.

18 Claims, 1 Drawing Sheet

(51) Int. Cl.
*H01F 27/29* (2006.01)
*H01F 27/28* (2006.01)

(58) Field of Classification Search
USPC .......................... 336/146, 200, 192, 232, 223
See application file for complete search history.

(56) References Cited

U.S. PATENT DOCUMENTS

| | | | | |
|---|---|---|---|---|
| 4,825,056 | A * | 4/1989 | Ohta | G06K 7/10336 235/449 |
| 4,847,986 | A * | 7/1989 | Meinel | H01F 17/0033 29/602.1 |
| 5,187,456 | A | 2/1993 | Hayashi | |
| 5,379,207 | A * | 1/1995 | Shah | 363/64 |
| 5,543,773 | A | 8/1996 | Evans et al. | |
| 5,939,955 | A * | 8/1999 | Chen | H03H 7/0115 333/167 |
| 5,976,715 | A | 11/1999 | Chen et al. | |
| 6,111,451 | A * | 8/2000 | Imam | G11C 5/14 327/343 |
| 7,609,536 | B2 * | 10/2009 | Brochu | H02M 7/08 323/255 |
| 2001/0043135 | A1 | 11/2001 | Yamada et al. | |
| 2005/0017054 | A1 * | 1/2005 | Iverson et al. | 228/180.5 |
| 2005/0122198 | A1 * | 6/2005 | Zhou | H01F 17/0033 336/200 |
| 2005/0275497 | A1 * | 12/2005 | Ramadan | H01F 5/003 336/200 |
| 2006/0186981 | A1 * | 8/2006 | Jang et al. | 336/215 |
| 2006/0220777 | A1 * | 10/2006 | Nakahori | 336/212 |
| 2007/0139976 | A1 * | 6/2007 | deRochemont | B82Y 30/00 363/17 |
| 2008/0197963 | A1 * | 8/2008 | Muto | H01F 17/0013 336/200 |
| 2009/0147541 | A1 * | 6/2009 | Shimada et al. | 363/15 |
| 2010/0007456 | A1 * | 1/2010 | Joehren et al. | 336/200 |

FOREIGN PATENT DOCUMENTS

| | | | |
|---|---|---|---|
| EP | 1178504 | A1 | 2/2002 |
| JP | H06196346 | A | 7/1994 |
| JP | H09219323 | A | 8/1997 |

* cited by examiner

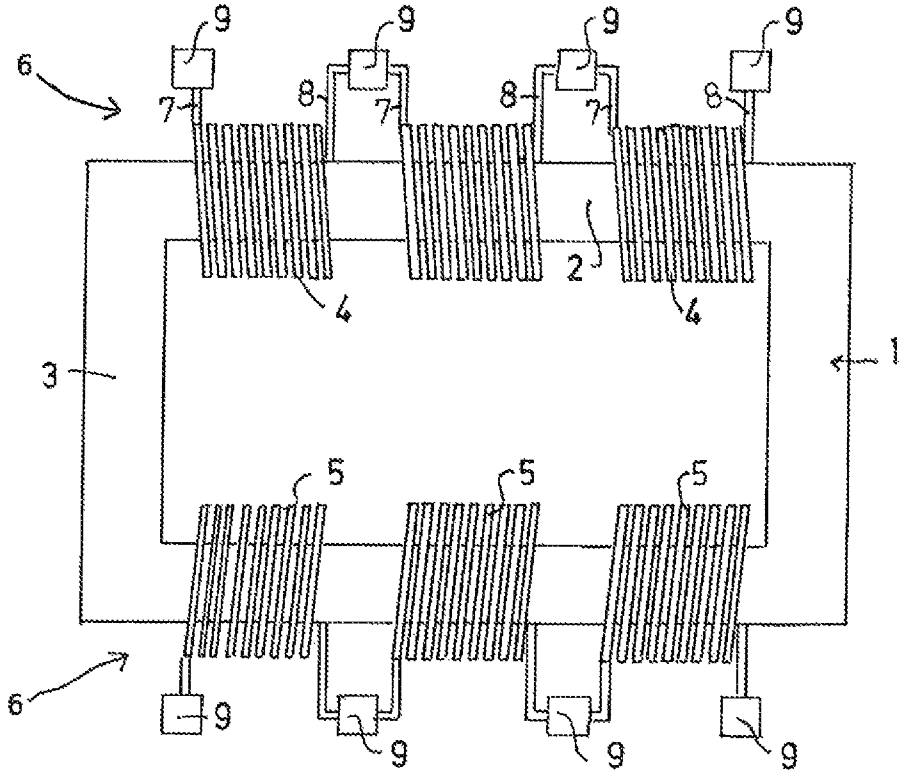
9
9
9
9
6
7
8
7
8
7
8
2
4
4
3
1
5
5
5
6
9
9
9
9

INDUCTION COMPONENT

The invention relates to an induction component.

As the switching frequency of electrical power circuits and controllers increases continuously, new induction components are also always required. These should primarily have a lower inductance, for example in the switching frequency range between 10 Hz and 30 MHz an inductance of between 100 nH and 300 nH for transformers and between 20 nH and 200 nH for inductances. Furthermore, these induction components should also have a smaller size.

An induction component which can be used both as inductance and as a microtransformer is already known (EP 1178504 A1).

Furthermore, a microtransformer, wherein individual turns of a conductor are arranged around a magnetic insert, is known (U.S. Pat. No. 5,976,715 A).

The invention is based on the object of providing an induction component which provides a multiplicity of different application possibilities with a small space requirement.

In order to achieve this object, the invention proposes an induction component having the features mentioned in claim 1. Developments are the subject matter of the dependent claims.

By providing two coil devices which are arranged on a common magnet core, it is possible to use the induction component as a transformer. In this case, it Is possible to choose, both on the primary side and on the secondary side, whether one or both coils of each coil device are used. As a result, a transformation of 1:1, 1:2, 2:1, 2:2 is possible. If each coil device is allowed to consist of more than two coils, the number of possibilities is correspondingly greater.

In the simplest example with two coil devices which each consist of two adjacent coils, the induction component can also be used for representing an inductance with four different values, depending on how many of the coils provided are connected in series.

Therefore, an induction component is provided which offers eight different application possibilities in the example just discussed.

A further advantage of the induction component proposed by the invention consists in that relatively. large switching frequency ranges can be covered by only one component or one component can be used for a larger bandwidth. If, for example, three coils are required for a switching frequency of 10 MHz, but still only one coil is required for 20 MHz, this can be achieved using a single component. In this way, the choice of components is facilitated for the user, procurement costs are reduced and the spectrum of inductance values that need to be available is smaller.

The profile size of such an induction component Should be capable of being in a range of from 0.5 to 0.3 mm or below, for example.

As an example of the size for such components, the sizes 1008, 0805, 0603, 0402 or 0201 can be mentioned.

In a development of the invention, provision can be made for the adjacent end windings of in each case two adjacent coils to be connected to a common solder pad. Therefore, the interconnection of the individual coils and also the manufacture are simplified since the component in the mentioned example with two coil devices of in each case two coils has only six solder pads.

In Particular, in a development of the invention, provision can be made for the ring to have a rectangular shape and each of the two coil devices to be formed on a respective limb of the rectangle.

In a development of the invention, provision can be made for all of the coils of a coil device to have the same winding sense. In this case, it is also possible for the winding sense in both coil devices to be identical.

Although it is conceivable for the number of turns in each coil and in each coil device to be different, an accordance with the invention, in one development, provision can be made for all of the coils of a coil device to have the same turns number, wherein in particular this can also apply to the coil devices with respect to one another.

That which has already been mentioned for the turns number and the winding sense can, in one development of the invention, also apply to the cross section of the electrical conductors forming the coils.

The invention proposes producing the coils and their turns using a thin film method. The individual conductor tracks of the turns are produced by a combination of sputtering and electroplating. In particular, provision is made for the coils to be produced by electroplating of copper.

The magnet core is produced by depositing soft magnetic material, for example Ni, NiFe, CoFe, CoZrTi.

The desired inductance to be produced can be adjusted by the number of turns and the selection of the material for the magnetic core.

Further features, details and preferences of the invention result from the claims and the abstract, with the wording of said claims and abstract hereby being incorporated by a reference in the content of the description, and from the following description of preferred embodiments of the invention as well as with reference to the drawing, in which:

FIG. 1 shows, schematically, the illustration of a possible induction component in accordance with the invention.

FIG. 1 shows the plan view of the induction component. In the embodiment illustrated, it contains a magnet core 1. This has the shape of a rectangular ring, with two limbs 2 running in the longitudinal direction and two transverse limbs 3 connecting said limbs. A plurality of coils 4 are arranged around each longitudinal limb 2, wherein all of the coils 4, 5 of a longitudinal limb 2 form a coil device 6. The expression that the coils 4, 5 are wound is only to be understood in terms of function since the coils are produced using the thin film method, i.e. are not wound. This method for producing coils. is known per se.

Each coil 4 has a winding start 7 and an end winding 8. All of the coils 4 are wound in the same direction, i.e. have the same winding sense. All of the coils 4 have the same number of turns. The coils 4 are arranged one behind the other in the longitudinal direction of the limb 2 and have a certain distance from one another. The winding start 7 of the coil 4 illustrated furthest on the left is passed out and connected to a solder pad 9. The end winding 8 of this coil is likewise passed out and connected to a solder pad 9. The winding start 7 of the second coil is also connected to this solder pad 9. The end winding 8 of said second coil is in turn connected to a solder pad 9, to which the winding start 7 of the third coil is also connected.

Everything that has been mentioned for the coils 4 of the first coil device 6 also applies to the second coil device illustrated below in FIG. 1. In particular, the turns numbers and the winding sense of the coils can also be the Same as one another.

The induction component shown in FIG. 1 has in total 8 connections. By virtue of the subdivision. into two coil devices, which are not electrically connected to one another, the induction component can be used as a transformer. The following transformation ratios are possible 1:1, 1:2, 1:3, 2:1, 2:2, 2:3, 3:1, 3:2, 3:3.

However, it is also possible to use the induction component as an inductance, wherein a single coil 4 or else a series connection of a plurality of coils both 4 and 5 can be used. Therefore, an inductance with the inductance value of a coil up to the inductance value of 6 coils can be implemented.

The invention claimed is:

1. An induction component, comprising
a magnet core in the form of a closed ring comprising
a first section of the closed ring and
a second section of the dosed ring,
wherein the first section is an opposite side of the closed ring from the second section,
a first coil device on the first section and a second coil device on the second section, wherein each coil device includes
a plurality of coils, each coil including a plurality of turns, a winding start and an end winding, wherein the plurality of coils includes
a starter coil having a winding start guided outwards and exclusively connected to a starting solder pad and
an ending coil having an end winding guided outwards and exclusively connected to an ending solder pad and
wherein the end winding of at least one coil in the plurality of coils and the winding start of at least one other coil in the plurality of coils are guided outwards and both connected to an intermediary solder pad.

2. The induction component as claimed in claim 1, wherein the ring has a rectangular shape and each of the two coil devices is formed on a respective limb.

3. The induction component as claimed in claim 1, wherein all of the coils of at least one coil device have a same winding sense.

4. The induction component as claimed in claim 1, wherein all of the coils of at least one coil device have a same turns number.

5. The induction component as claimed in claim 1, wherein all of the coils of at least one coil device have a same line cross section.

6. The induction component as claimed in claim 1, wherein the turns of the coils are produced using thin film technology.

7. The induction component as claimed in claim 1, wherein the magnet core is produced using thin film technology.

8. The induction component as claimed in claim 1, wherein the at least two coils within the first and second coil devices are evenly spaced within the respective coil section for the coil device.

9. The induction component as claimed in claim 1, wherein the closed ring includes two opposing short sides and two opposing long sides, and the first and second sections are on different opposing long sides of the closed ring.

10. A transformer induction component, comprising
an induction component including
a magnet core in the form of a closed ring, the closed ring including
a first section of the closed ring and
a second section of the closed ring,
wherein the first section is an opposite side of the closed ring from the second section,
a first coil device on the first section and a second coil device on the second section, wherein each coil device includes
at least three coils, each coil including a plurality of turns, a winding start and an end winding, wherein the at least three coils include
a starter coil having a winding start guided outwards and exclusively connected to a starting solder pad and
an ending coil having an end winding guided outwards and exclusively connected to an ending solder pad, and
wherein the end winding of at least one coil of the at least three coils and the winding start of at least one other coil of the at least three coils are guided outwards and both connected to an intermediary solder pad,
wherein the transformation effected by the transformer is dependent on the number of coils in the at least three coils for a coil device.

11. The transformer as claimed in claim 10, wherein the ring has a rectangular shape and each of the two coil devices is formed on a respective limb.

12. The transformer as claimed in claim 10, wherein all of the coils of at least one coil device have a same winding sense.

13. The transformer as claimed in claim 10, wherein all of the coils of at least one coil device have a same turns number.

14. The transformer as claimed in claim 10, wherein all of the coils of at least one coil device have a same line cross section.

15. The transformer as claimed in claim 10, wherein the turns of the coils are produced using thin film technology.

16. The transformer as claimed in claim 10, wherein the magnet core is produced using thin film technology.

17. The transformer as claimed in claim 10, wherein the at least two coils within the first and second coil devices are evenly spaced within the respective coil section for the coil device.

18. The transformer as claimed in claim 10, wherein the closed ring includes two opposing short sides and two opposing long sides, and the first and second sections are on different opposing long sides of the closed ring.

* * * * *